United States Patent [19]

Jay et al.

[11] Patent Number: 5,397,517
[45] Date of Patent: Mar. 14, 1995

[54] METHOD OF MAKING A SEAT CUSHION BASE

[75] Inventors: Eric C. Jay, Boulder; Richard R. Runkles, Englewood; John Dyer, Evergreen; John Dinsmoor, Westminster; Joe Stoneburner, Loveland, all of Colo.

[73] Assignee: Jay Medical Inc., Torrance, Calif.

[21] Appl. No.: 106,237

[22] Filed: Aug. 13, 1993

[51] Int. Cl.6 .................. B29C 67/22; B29C 67/20
[52] U.S. Cl. ............................. 264/45.5; 264/46.6; 264/46.7; 264/138; 264/321; 156/211; 156/245
[58] Field of Search ............... 156/245, 211, 79; 264/321, 138, 271.1, 46.4, 46.6, 45.5, 46.7; 297/452.26

[56] References Cited

U.S. PATENT DOCUMENTS

| | | | |
|---|---|---|---|
| 2,878,153 | 3/1959 | Hacklander | 264/46.4 |
| 3,534,129 | 10/1970 | Bartel | 264/255 |
| 4,040,881 | 8/1977 | Wallace | 264/321 |
| 4,116,736 | 9/1978 | Sanson et al. | 156/245 |
| 4,250,136 | 2/1981 | Rex | 264/321 |
| 4,541,885 | 9/1985 | Caudill, Jr. | 156/245 |
| 4,588,229 | 5/1986 | Jay | 297/452.25 |
| 4,614,558 | 9/1986 | Kobe | 156/245 |
| 4,670,925 | 6/1987 | Carussi | 264/46.4 |
| 4,698,252 | 10/1987 | Koch et al. | 264/321 |
| 4,726,624 | 2/1988 | Jay | 297/452.23 |
| 4,873,036 | 10/1989 | Urai | 264/46.4 |
| 4,995,926 | 2/1991 | Urai | 156/245 |
| 4,999,068 | 3/1991 | Chiarella | 264/279.1 |
| 5,006,188 | 4/1991 | Usui et al. | 156/245 |
| 5,018,790 | 5/1991 | Jay | 297/452.25 |

Primary Examiner—Allan R. Kuhns
Attorney, Agent, or Firm—Cook, Egan, McFarron & Manzo, Ltd.

[57] ABSTRACT

A lightweight contoured base for a seat cushion is produced by first forming a shaped lightweight foam core with a void corresponding to the ischial tuberosities of a user and then forming a sandwich assembly by placing a layer of foam or foamable material against both upper and lower surfaces of the shaped lightweight foam core to form a sandwich assembly. The sandwich assembly is then molded to produce the finished contoured base for a seat cushion.

20 Claims, 6 Drawing Sheets

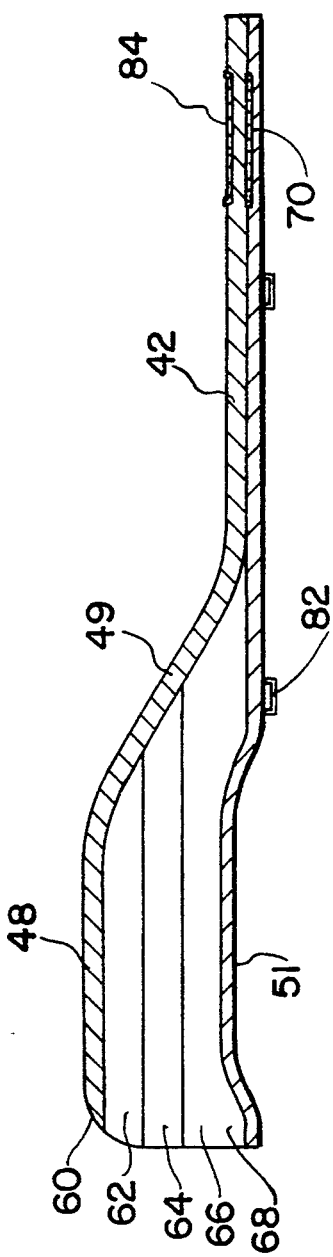
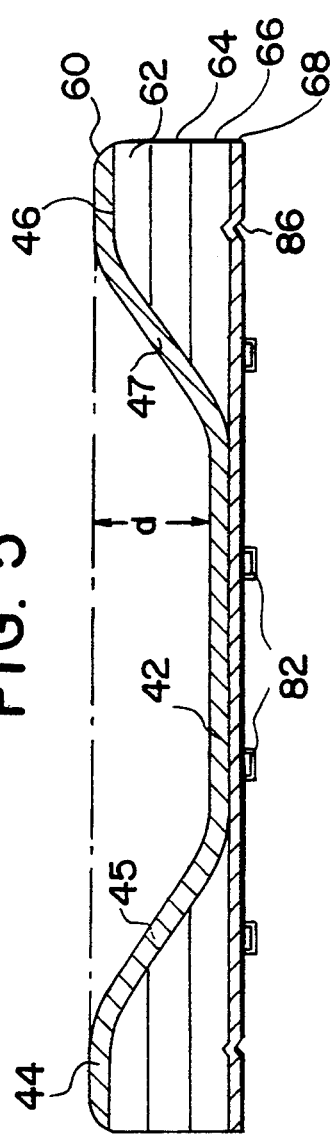

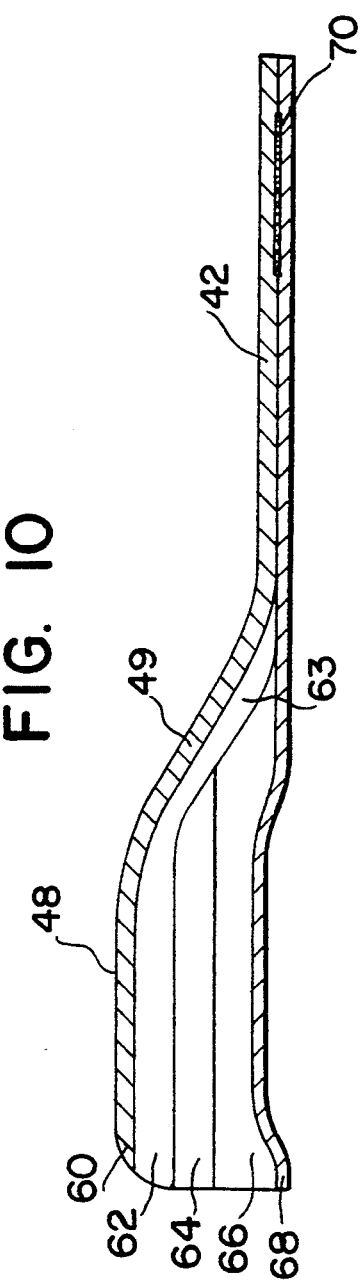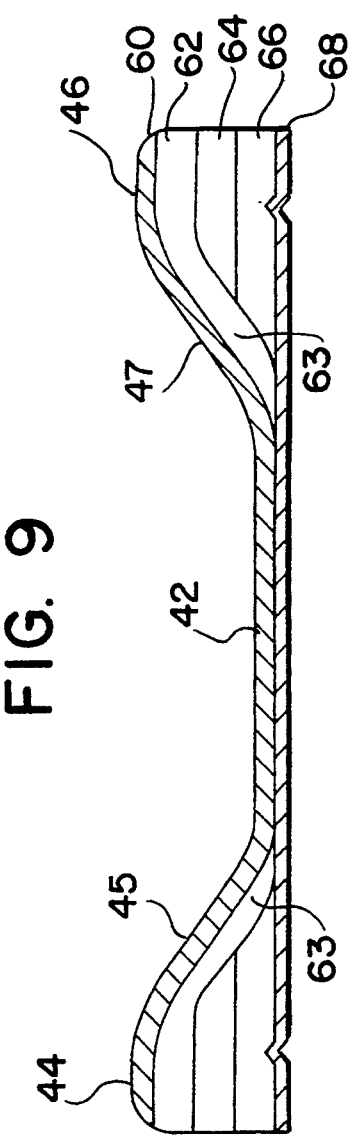

METHOD OF MAKING A SEAT CUSHION BASE

The present invention is directed to a new and improved seat cushion. In particular, the present invention is directed to a new lightweight cushion base which may serve as the tray portion for a fluid-filled pad for use in a seat cushion combination, particularly for use in wheelchairs.

BACKGROUND

U.S. Pat. Nos. 4,588,229 and 4,726,624 to Jay (as well as other Jay patents), describe and claim seat cushions for wheelchairs which comprise a combination of a fluid-filled, segmented pad juxtaposed over a relatively rigid, shaped supporting base or tray. The aforesaid Jay patents teach the manufacture of the tray from polyurethane foam, which may be formed in a process which provides a self-skinned polyurethane film on the surface of the foam. The wheelchair seat cushions described in the Jay patents have been commercialized using integral skin polyurethane foam trays, and these seat cushions have proved to be an enormous commercial success. However, integral skin polyurethane foam trays are relatively heavy and consequently these prior art seat cushions are also relatively heavy. Furthermore, most molded integral skin polyurethane foams contain an open-celled structure underneath the skin which is prone to moisture or urine absorption if the skin is damaged or cut. Tray modifications are common to accommodate specialized user needs, such as cutouts for the wheelchair seat rails to lower the cushion in the chair, or trimming the edges of the tray to narrow the cushion to fit a particular wheelchair. Non-integral-skin urethane foam may be used but a sealant must be painted over the surface to prevent moisture or urine absorption and the same modification problems exist.

The cushions of the present invention are significantly lighter than the prior art cushions based on polyurethane foam trays. For example, a standard sized seat cushion base, made in accordance with the present invention weighs less than 50% of the weight of the same size seat cushion base made from the prior art polyurethane foam. Because these trays are designed to be used as components of wheelchair cushions and wheelchairs are usually propelled by the wheelchair users, any reduction in weight is a great advantage. Many wheelchair users have impaired function of their upper extremities, thus making for difficulties in grabbing, handling, or otherwise lifting heavy objects. The wheelchair cushion is usually transferred from one seating surface to another by the user and, therefore, must be light weight.

BRIEF DESCRIPTION OF THE PRESENT INVENTION

In order to function as the tray or base for the wheelchair cushions described in the Jay patents, it is necessary that the base be shaped in a manner so that its contours cooperate with the fluid-filled pad which forms a portion of the seat cushion combination. Specifically, the base must have a depressed area which fits beneath the ischial tuberosities and coccyx of a user of the seat cushion. Moreover, the base must have side rims and sloped surfaces which extend between the side rims and the depressed area beneath the user's ischial tuberosities and coccyx. The base also must have a front rim and a sloped surface which extends between the front rim and the depressed area. Preferably, the front portion of the base also has supporting surfaces for the legs of the user and the base may have a raised central portion, positioned between the legs, which helps to spread the legs apart. Thus, the depressed area is defined by the sloped surfaces which extend upwardly from its sides and front to the side rims and the front rim.

The sloped surfaces which adjoin the sides and front of the depressed area must be relatively steep in order to function properly as a seat base. The steep slopes, and the large differences in overall thickness from one area of the base to other areas, however, cause fabrication problems when one attempts to mold or thermoform a seat base from a blank of lightweight closed cell foam, primarily due to the total volume of foam material that must be displaced from the depressed area.

The present invention is directed to a method of making a contoured base for a seat cushion wherein a rectangular block core is formed of lightweight foam. The core has the same general dimensions of the length and width of the seat base and the same general height as the overall height of the finished seat base minus any additional formed layers. The core is shaped (i.e., the core may be carved, cut, punched, die cut, pre-molded, etc.) to create a void which ultimately creates the depressed area of the base. The shaped core is then sandwiched between monolithic top and bottom layers of foam. These top and bottom layers are laminated to the horizontal top and bottom surfaces of the shaped foam core. The entire laminated sandwich structure is heated to an appropriate temperature and then placed in a compression molding tool of specific size and dimensions of the final seat base. The laminated sandwich must be positioned appropriately within the compression mold so that the void of the core corresponds to the depressed area of the molding tool. The laminated sandwich is then subjected to sufficient heat and pressure so as to form a unitary sandwich having the specific dimensions of the molding tool. The process produces a contoured lightweight base which is free of voids, and with sufficient rigidity to function as a base or tray in the seat cushion.

In the preferred embodiment, a transverse reinforcing member is positioned beneath the depressed area, between the top layer and bottom layer, extending essentially across the width of the depressed area. Thus, the reinforcing member urges the seat base to maintain a flat bottom configuration across the width of the depressed area and thus reduces the tendency of the base member to permanently deform to the shape of a wheelchair sling seat.

BRIEF DESCRIPTION OF THE DRAWINGS

FIG. 5 is a sectional rear view of the base of the present invention taken at section A—A of FIG. 4;

FIG. 6 is a sectional side view of the base of the present invention taken at section B—B of FIG. 4.

FIG. 9 is a sectional rear view of the preferred embodiment of the base; and

FIG. 10 is a sectional side view of the preferred embodiment of the base.

THE SHAPED TRAY

Figure 1:
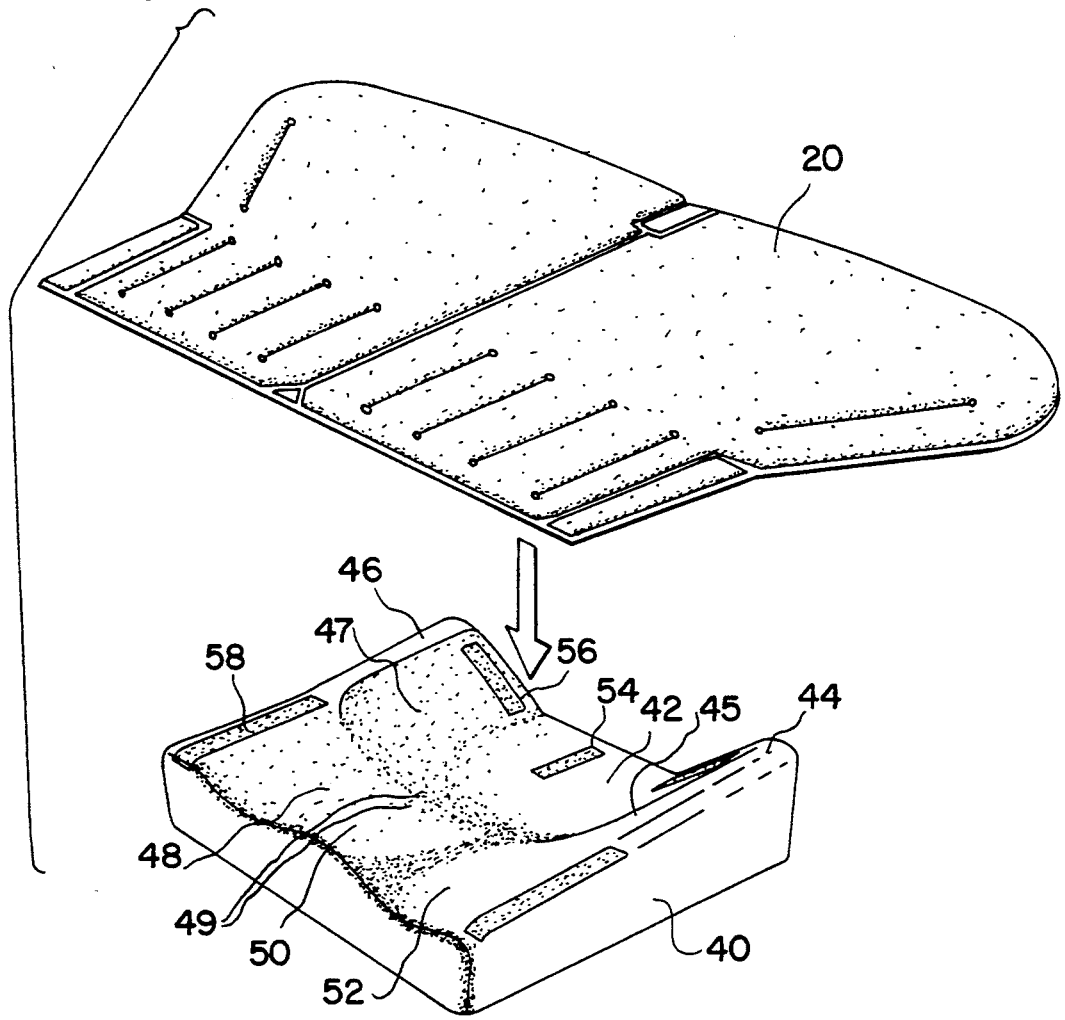
FIG. 1 is an isometric view of the contoured base of the present invention, showing a fluid-filled pad juxtaposed above the base.

The general contours of the shaped tray or base 40 are shown in FIG. 1. Base 40 is used in combination with a fluid filled pad 20 to form a seat cushion. The base must be wide enough to support a human being. Bases of about 15.5 inches or 18 inches width (or as large as 24 inches in width), are suitable because they fit most persons and may be used in standard size wheelchairs. Smaller sizes, such as 10 inch, 12 inch, or 14 inch widths may be fabricated for children. The invention is not limited to any specific size.

The shape of the base 40 is critical. It is generally essential for the base to have a depressed area which is large enough to accommodate the ischial tuberosities of the person using the seat cushions. The depressed area 42 surrounded by rims 44 and 46 on each side and rim 48 on the front. A front rim 48 is preferably deeper, i.e., (extends from a front edge approximately 40% of the distance of the back edge of the tray) with a central rise or pummel 50 adapted to spread the users legs and urge the users legs into support areas 52. It is essential that a rear portion of the tray be open, i.e., no rim at the back in order to avoid building pressure in the area of the coccyx. Because the distance between the ischial tuberosities in adults is between 4.5 and 6 inches, the cut out at the rear of the tray must be at least 6 inches wide, and is preferably at least 8 inches wide in order to provide for a certain amount of shifting from side to side of the user of the cushion. Generally it is desired that the person have from 1 to 3 inches room to shift from side to side and from 1 to 5 inches room to shift from front to back. This allows the user to shift position without developing any undesired pressures from the tray.

As shown in FIG. 5, the side rims 44 and 46 are essentially vertical on the outside of tray 40, but sloped surfaces 45 and 47 extend downwardly to the sides of the depressed area 42 on the inside of the tray. The depth of the depressed area is shown as dimension "d" on FIG. 5. The sloping of the rims prevents the unchecked movement of the fluid-filling material away from the body. Similarly, the front rim 48 is relatively vertical on the outside at base 40, but sloped surface 49 extends inwardly and downwardly to the front of the depressed area 42, on the inside of the tray. The inward sloping of surface rims 45 and 47 combined with inward sloping of front surface 49 urges the fluid-filling material in the path to remain in the required position.

The base need not be attached to the pad, but attachment is preferred. Center attachment 54, which may be a hook and loop type fastener, at the rear of the base is designed in order to prevent the pad 20 from slipping forward, and may be the sole attachment means. Preferably the rear edge of the base along the inwardly sloping surfaces 45 and 47 of side rims is provided with hook and loop type fastener strips 56 in order to attach the pad. Strips 58 mounted on side rims 44 and 46 may be used to hold the outer edge of the pad 20 adjacent to side rims 44.

FORMATION OF THE CORE

In the finished base, the core functions to provide separation of the top and bottom layer of the base and to provide sufficient rigidity to prevent the base from collapsing during use. Generally, the core should be made of the lightest possible material. While a variety of materials such as polystyrene foam may be used, in the preferred embodiment, a closed-cell, cross-linked polyethylene foam having a density of approximately 2 lbs per cubic foot is used. Specifically, a cross-linked polyolefin foam sold by Hüls America, Inc. under the trademark Trocellen ® XFA250, which contains a fire retardant, may be used. This provides the required rigidity and adequate resistance to deflection under a compression load of a seated person.

Because some of the preferred foam materials are commercially available only in thin layers, it is contemplated that the core may be fabricated by laminating together several layers of the same or different foam. The overall structural rigidity of the base may be further enhanced by using stiffer layers of foam throughout the foam core or perhaps at the extreme side of the foam core.

In the preferred embodiment, the core 72 is a rectangular block of foam having a length and width which approximate the size of the seat cushion and having a thickness which approximates the depth of the depressed area. Depending upon the material selected for use in the core, the core may be laminated from one or more different layers of foam. When the core is made from multiple layers of foam, the layers may be joined by any of the conventionally used techniques. The layers may be joined using adhesives, heat lamination, or the like. It may be helpful depending upon the type of foam used, to roughen the surface of the foam in order to achieve a better lamination. It is generally desired to eliminate any air or other gas bubbles between the layers because such bubbles can cause failure of the core when it is placed in use.

Figure 2:
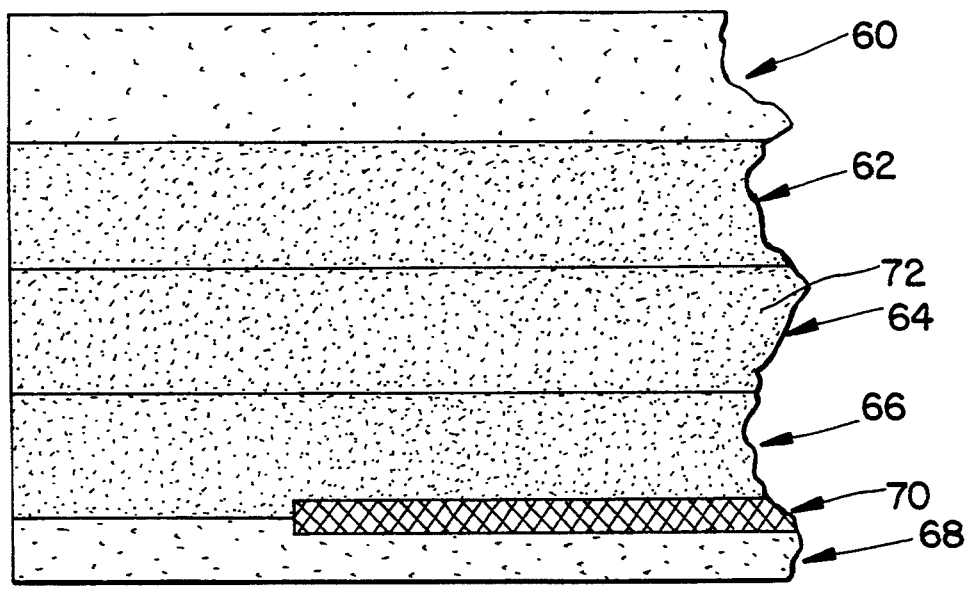
FIG. 2 is a partial side view of the base, cut away, to reveal the foam layers and the reinforcing member.

FIG. 2 illustrates the layout of a core 72 of the preferred embodiment wherein the core is comprised of layers 62, 154, and 66 each of which is preferably a ½ inch thick layer of 2 lb per cubic foot polyethylene foam. These layers are joined, as is explained below, by heat laminating the layers together by heat lamination under a slight pressure. The thickness of the core should thus be approximately the depth of the depressed area as shown in FIG. 5 as dimension "d".

Alternatively, the core may be fabricated from a single piece of foam, provided it is sufficiently thick.

SHAPING THE CORE

Figure 3:
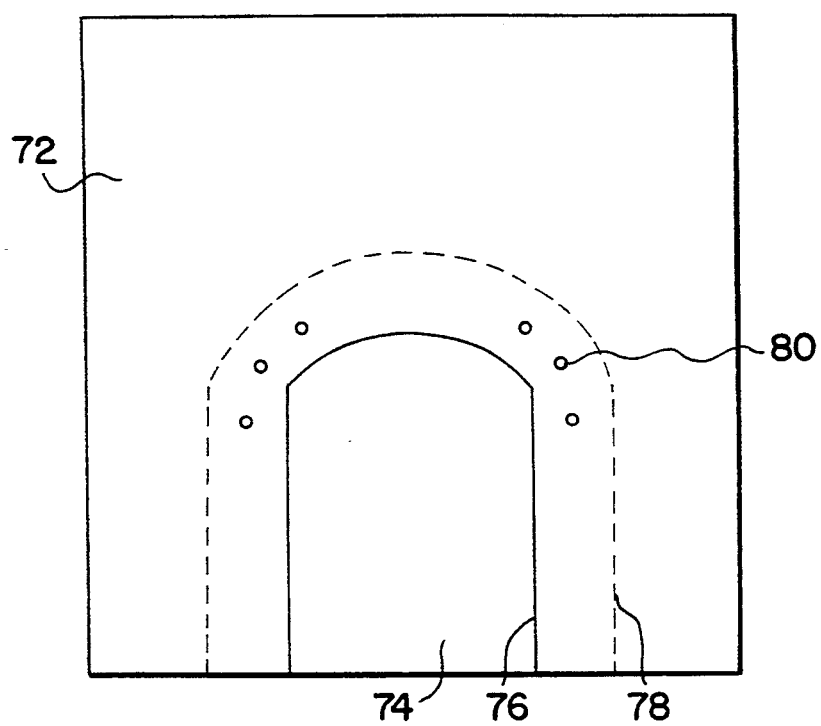
FIG. 3 is a bottom view of the core showing the cutout corresponding to the depressed area.

As is mentioned above, the core is generally a rectangular block having a size to approximate the length and width of the seat cushion with its thickness approximating the depth of the depressed area. As is shown in FIG. 3, the core must be shaped to create a void 74 in core 72 which slopes downwardly from top edge 78 to bottom edge 76 and thus the void approximates the size and shape of depressed area 42. The void may be carved, cut, punched, die cut, pre-molded, etc. The foam core may be shaped by a variety of mechanisms including knives, saws, hot wires, and the like. The particular mechanism used to remove the foam and produce the chamfered opening approximating the size of the depressed area is not critical.

The preferred embodiment of the shaped core is illustrated in FIGS. 7 through 10. In the preferred embodiment, the upper layer 62 of the core 72 includes extension 63 which is adapted to extend from the top edge 78 of void 74 to the bottom edge 76 of void 74 and thus extend downward to cover the chamfered, sloping surface of layers 64 and 63 as shown in FIGS. 9 and 10. Using this preferred structure, the fusion of the top layer 60 and bottom layer 68 to core 72 occurs primarily to the uncut external virgin skin of the foam core layers 62 and 66 which provides better adhesion properties than to the cut-surfaces of the void in the core.

THE OUTER LAYERS

The monolithic top and bottom layers 60 and 68 extend across the length and width of both the top and bottom of the core. Preferably, the top and bottom layers are made from a foam which is slightly stronger and slightly more dense than the foam used for the core. For example, a closed-celled, cross-linked polyethylene foam having a density of about 4 pounds per cubic foot sold under the trademark Trotellen ® XFA400, which contains a fire retardant, has been used with success.

The material used for the outer layers gives structural rigidity to the foam base. Ideally the outer layers also provide a monolithic, waterproof surface which prevents the base from absorbing liquids. Alternatively, the top and bottom layers may be fabricated from foams which do not contain a fire retardant.

In a further embodiment, a high resiliency polyurethane foam is placed over the core or over the top layer of the base in order to present a softer top surface to the user. Other layers of material may be used to cover either the top layer or the bottom layer of the base for certain purposes.

THE FORMATION OF THE SEAT BASE SANDWICH

In order to complete the production of the seat base, the top and bottom layers must be adhered to the core. It is important that the top layer and the bottom layer be continuously laminated to the outer surfaces of the core and, in the area of the depressed area, to one another, without the formation of the entrapped air or other discontinuities. The core may be joined to the outer layer by heat fusion and/or adhesives, but the heat fusion i.e. thermoforming method is preferred. It is necessary not only that the top and bottom layers adhere to the upper and lower surfaces of the core including the sloped portions of the foam core, but that the top and bottom layers must adhere to the each other throughout the depressed area.

THE REINFORCING MEMBER

The reinforcing member 70 shown in FIG. 6, is positioned between top layer 60 and bottom layer 68. It preferably extends from side rim 44 to side rim 46, across the width of depressed area 42 and thus extends between the lowest core layer 66 and bottom layer 68 near the side rims. The reinforcing member 70 serves to resist the tendency of the base to permanently deform to match the shape of a wheelchair sling seat.

The reinforcing member may be metal or other material, but preferably is constructed from a plastic material which tends to resist bending. In the preferred embodiment, the reinforcing member is constructed from a glass filed epoxy resin. Advantageously, the reinforcing member may be precoated with an adhesive to assist in its lamination between top layer 60 and bottom layer 68.

THE PREFERRED THERMOFORMING OPERATION

After the top layer 60, bottom layer 68 and the reinforcing member 70 have been joined with the core, the entire sandwich assembly is heated in an oven to selected forming temperature. After the selected forming temperature is reached, the sandwich assembly is positioned in the compression mold. Additional heat is applied to maintain all exposed surfaces at sufficient temperature to ensure adequate fusion of layers when the mold is closed.

The temperature of the mold members may be adjusted so that sufficient heat is removed from the top and bottom layers of the assembly to cause the surface of the foam to cool in order to reduce mold cycle time, which is preferred to lower costs.

As the thermoforming step is carried out, the foam assembly expands sideways by approximately 5% as the molding pressure is applied. It is important, however, that the side of the laminate not be restrained during the shaping operation in order to allow the escape of any air or other gases which might be present in the laminate during the molding operation. Small vent holes 80 (shown in FIG. 3) leading from the interior of the core through the exterior of the top layer 60 or bottom layer 68 may be used to minimize the entrapment of air or other gases. Allowing the escape of air and other gases eliminates the possibility of the formation of bubbles within the structure. Bubbles within the structure can lead to failure of the structure when in use, when the seat cushion is left in a hot car, the bubble may expand to create a bulge in the base and which forces layers apart.

After the base has been thermoformed, it is removed from the mold and the edges are trimmed to achieve the desired size and appearance. If desired, a variety of coatings may be applied to the molded and untrimmed or trimmed base in order to enhance the liquid resistance or abrasion of the base, to improve the fire resistance and/or for aesthetic purposes.

OTHER EMBODIMENTS

The present invention contemplates that the shaped core, of the type described above, may be employed as the core in a polyurethane foam cushion. Broadly speaking, a shaped polyethylene core, as described above, would be placed in a mold into which a foamable polyurethane composition is injected under conditions to cause foaming. If desired, a first layer of foamable polyurethane could be placed in the mold and foamed the shaped core, as described herein, could be placed on the preformed foam and the balance of the required foamable polyurethane injected into the mold, and foamed around the core, to form a completed polyurethane foam encased core. The polyurethane molding technique has the advantage of producing a base having a continuous, water proof, self-skin outer surface which is advantageous with respect to maintenance.

The present invention contemplates the formation of the central rise or pummel 50 in the base during the thermoforming operation by which the sandwich is formed into its final shape. As is shown in FIG. 6, an upward depression 51 may be formed directly under the pummel, during the thermoforming-molding operation.

Preferably the upward depression 51 will have approximately the same dimensions as pummel 50.

The present invention contemplates the formation of a base having a non-skid configuration on the bottom. The non-skid feature may be implemented by creating various raised features, such as an array of bumps 82 as shown in FIGS. 5 and 6, during the thermoforming-molding operation.

Figure 4:
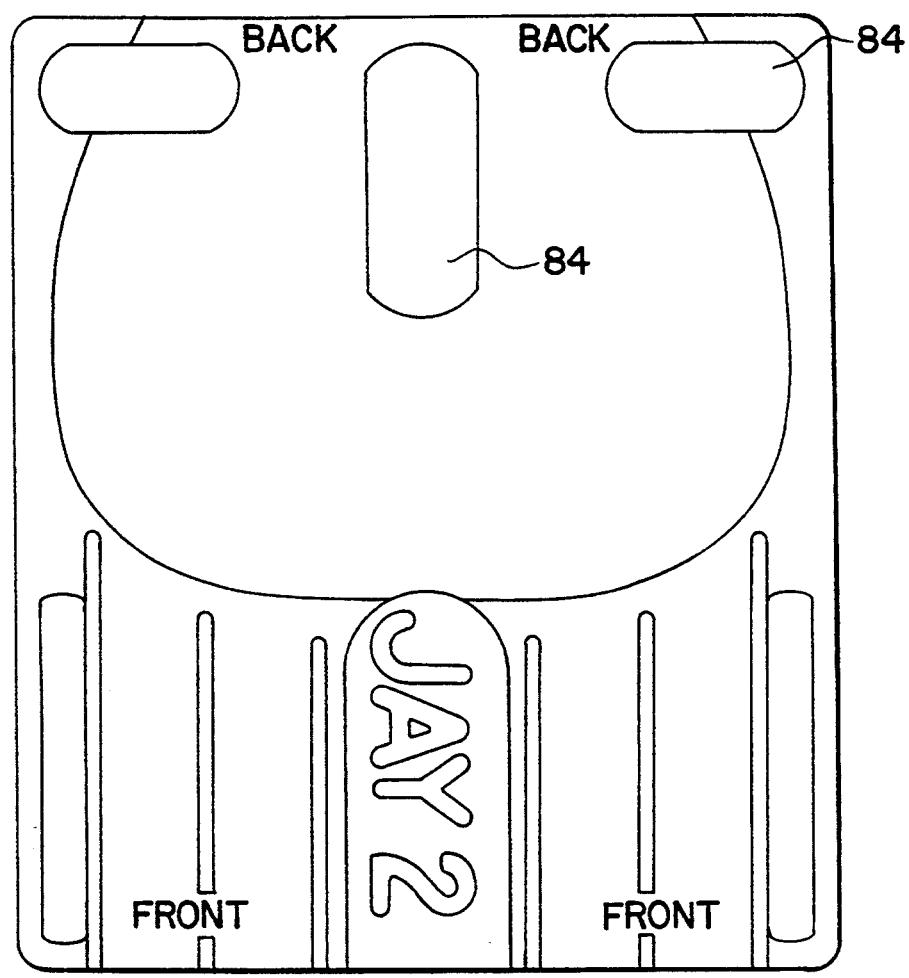
FIG. 4 is a top view of finished base of the present invention.
Figure 7:
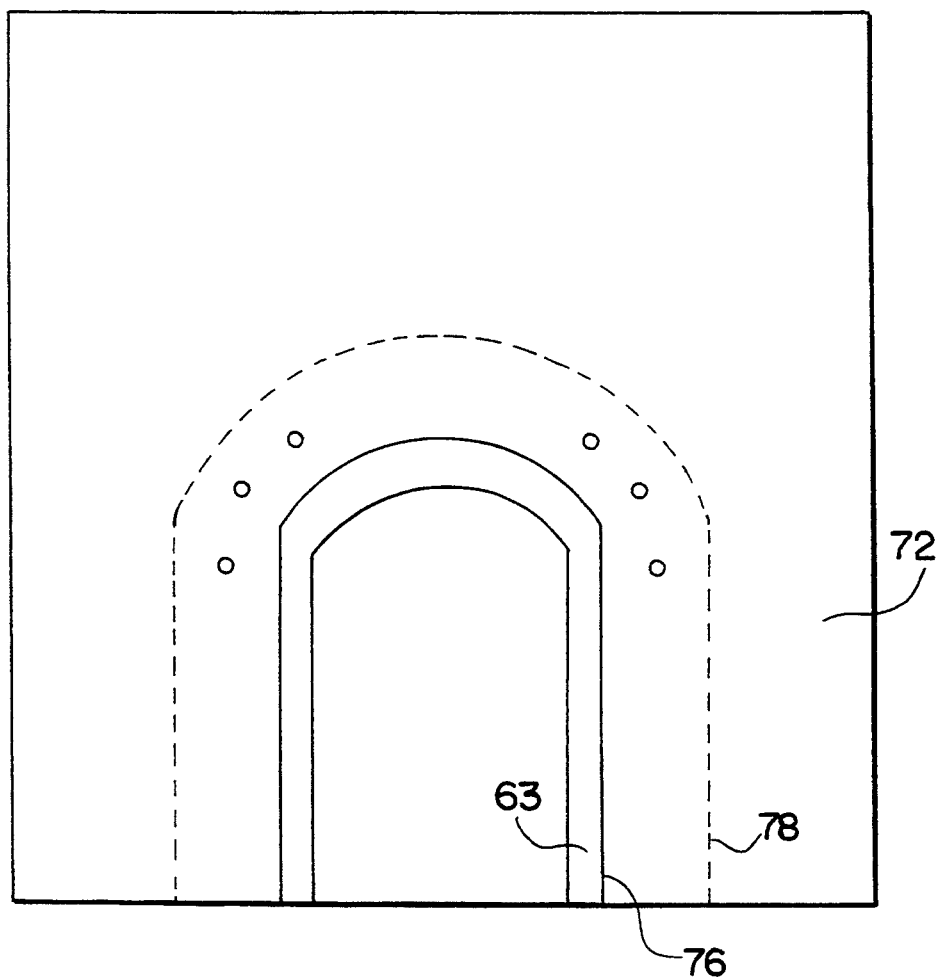
FIG. 7 is a bottom view of the preferred embodiment of the core wherein the cut-out of the top layer has been modified.
Figure 8:
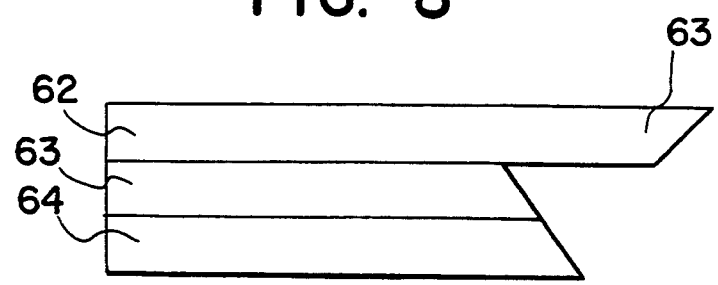
FIG. 8 is a sectional side view of the preferred embodiment of the core taken at section AA of FIG. 7.

The present invention contemplates forming on the upper surface of the top layer contoured portions specifically adapted to facilitate the placement of hook and loop fastening components. FIG. 4 illustrates depressed areas 84 which are contoured out to receive one portion of a hook and loop fastener 56 or 58. The depressed area 84 increases the efficiency of the hook and loop fastener to maintain pad 20 in the desired position.

The present invention contemplates the formation of longitudinal groove 86 in the bottom surface of the base as shown in FIG. 5, in order to assist the user in customizing the seat base, wherein it is necessary to cut the base to narrow the width of the seat cushion.

The forms of invention shown and described herein are to be considered only as illustrative. It will be apparent to those skilled in the art that numerous modifications may be made therein without departing from the spirit of the invention or the scope of the appended claims.

We claim:

1. A method for producing a lightweight contoured base for a seat cushion, said base having a depressed area beneath a user's ischial tuberosities, said base having side rims and sloped surfaces extending between said side rims and said depressed area, said base having a front rim and a sloped surface extending between said front rim and said depressed area;

said method comprising:
- forming a core of lightweight foam, said core having a length and width approximately the length and width of said base, said core having a thickness approximately the depth of said depressed area;
- shaping said core by removing foam therefrom to produce a void in said core approximately the size and shape of said depressed area;
- covering the upper and lower surfaces of said shaped core with a top layer of foam and a bottom layer of foam to form a sandwich assembly; and
- molding said sandwich assembly to cause said top layer and said bottom layer to adhere to said upper and lower surfaces of said core, to produce a finished shape and to cause said top layer to adhere to said bottom layer throughout said depressed 2. The method of claim 1, wherein said sandwich assembly is heated prior to said molding step.

3. The method of claim 1, wherein an adhesive is used to adhere said top layer to said core.

4. The method of claim 1, wherein an adhesive is used to adhere said bottom layer to said core.

5. The method of claim 1, wherein heat lamination is used to adhere said top layer to said core.

6. The method of claim 1, wherein heat lamination is used to adhere said bottom layer to said core.

7. The method of claim 1, wherein said core is formed from a plurality of layers of foam.

8. The method of claim 7, wherein the top layer of said core extends over the shaped surface of said void whereby said top layer is adhered to uncut virgin foam skin surfaces along sloped surfaces of depressed area.

9. A method for producing a lightweight contoured base for a seat cushion, said base having a depressed area beneath a user's ischial tuberosities, said base having side rims and sloped surfaces extending between said side rims and said depressed area, said base having a front rim and a sloped surface extending between said front rim and said depressed area, said base including a transverse reinforcing member, positioned beneath said depressed area, said reinforcing member extending essentially across the width of said depressed area;

said method comprising:
- forming a core of lightweight foam, said core having a length and width approximately the length and width of said base, said core having a thickness approximately the depth of said depressed area;
- shaping said core by removing foam therefrom to produce a void in said core approximately the size and shape of said depressed area;
- covering the upper and lower surfaces of said shaped core with top layer of foam and a bottom layer of foam to form a sandwich assembly; and
- molding said sandwich assembly to cause said top layer and said bottom layer to adhere to said upper and lower surfaces of said core, to produce a finished shape, to affix said reinforcing member between said top layer and said bottom layer and to cause said top layer to adhere to said bottom layer throughout said depressed area.

10. The method of claim 9, wherein said sandwich assembly is heated prior to said molding step.

11. The method of claim 9, wherein an adhesive is used to adhere said top layer to said core.

12. The method of claim 9, wherein an adhesive is used to adhere said bottom layer to said core.

13. The method of claim 9, wherein heat lamination is used to adhere said top layer to said core.

14. The method of claim 9, wherein heat lamination is used to adhere said bottom layer to said core.

15. The method of claim 9, wherein said core is formed from a plurality of layers of foam.

16. The method of claim 15, wherein the top layer of said core extends over the shaped surface of said void whereby said top layer is adhered to uncut virgin foam skin surfaces along sloped surfaces of depressed area.

17. The method of claim 9, wherein the transverse reinforcing member is pre-coated with an adhesive.

18. The method of claim 9, wherein the transverse reinforcing member is constructed from glass filled epoxy material.

19. A method for producing a lightweight contoured base for a seat cushion, said base having a depressed area beneath a user's ischial tuberosities, said base having side rims and sloped surfaces extending between said side rims and said depressed area, said base having a front rim and a sloped surface extending between said front rim and said depressed area;

said method comprising:
- forming a core of lightweight foam, said core having a length and width approximately the length and width of said base, said core having a thickness approximately the depth of said depressed area;
- shaping said core by removing foam therefrom to produce a void in said core approximately the size and shape of said depressed area;

placing said core in a mold with a foamable polyurethane composition; causing said foamable polyurethane composition to foam to encase said core in polyurethane foam; and allowing said foam to expand to fill the mold.

20. A method as described in claim 19, wherein the polyurethane foam is caused to form a self-skinned urethane foamed surface.

* * * * *